US012157241B2

(12) United States Patent
Feuerstein et al.

(10) Patent No.: US 12,157,241 B2
(45) **Date of Patent: *Dec. 3, 2024**

(54) BOLT CUTTER

(71) Applicant: Milwaukee Electric Tool Corporation, Brookfield, WI (US)

(72) Inventors: Jacob Feuerstein, Del Mar, CA (US); Christopher S. Hoppe, Cedarburg, WI (US); Anthony S. Graykowski, Belgium, WI (US); Cheng Zhang Li, Sussex, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 712 days.

This patent is subject to a terminal disclaimer.

(21) Appl. No.: 17/373,373

(22) Filed: Jul. 12, 2021

(65) Prior Publication Data

US 2021/0339411 A1 Nov. 4, 2021

Related U.S. Application Data

(63) Continuation of application No. 16/436,563, filed on Jun. 10, 2019, now Pat. No. 11,090,822, which is a (Continued)

(51) Int. Cl.

| | |
|---|---|
| ***B26B 17/02*** | (2006.01) |
| ***B25G 1/04*** | (2006.01) |
| ***B25G 1/06*** | (2006.01) |

(52) U.S. Cl.

CPC ................ *B26B 17/02* (2013.01); *B25G 1/04* (2013.01); *B25G 1/043* (2013.01); *B25G 1/06* (2013.01); *B25G 1/066* (2013.01)

(58) Field of Classification Search

None

See application file for complete search history.

(56) References Cited

U.S. PATENT DOCUMENTS

| | | |
|---|---|---|
| 351,339 A | 10/1886 | Pullman |
| 444,635 A | 1/1891 | Helwig |

(Continued)

FOREIGN PATENT DOCUMENTS

| | | |
|---|---|---|
| CN | 1481976 | 3/2004 |
| CN | 201067918 | 6/2008 |

(Continued)

OTHER PUBLICATIONS

International Preliminary Report of Patentabiliy for International Application No. PCT/US2016/065822 dated Jun. 21, 2018, 9 ages.

(Continued)

*Primary Examiner* — Hwei-Siu C Payer

(74) *Attorney, Agent, or Firm* — Reinhart Boerner Van Deuren s.c.

(57) ABSTRACT

A cutter including a cutting head and an adjustable handle pivotally coupled to the cutting head. The adjustable handle includes a first adjustment assembly to change a length the adjustable handle extends from the cutting head. The adjustable handle also includes a second adjustment assembly to change the position of the adjustable handle with respect to the cutting head.

18 Claims, 10 Drawing Sheets

Related U.S. Application Data continuation of application No. 15/374,031, filed on Dec. 9, 2016, now Pat. No. 10,343,295.

(60) Provisional application No. 62/265,536, filed on Dec. 10, 2015.

(56) References Cited

U.S. PATENT DOCUMENTS

| | | | | |
|---|---|---|---|---|
| 1,851,771 | A | 3/1932 | Keith | |
| 2,020,242 | A | 11/1935 | Geddes | |
| 2,382,307 | A | 8/1945 | Geddes | |
| 2,587,586 | A | 3/1952 | Bernardi | |
| 2,685,130 | A | 8/1954 | Tibbetts | |
| 2,921,773 | A | 1/1960 | Hoelzer | |
| 3,340,611 | A | 9/1967 | Lauck | |
| 3,574,938 | A | 4/1971 | Porter | |
| 3,733,626 | A | 5/1973 | Allen | |
| 3,949,473 | A | 4/1976 | Blanc | |
| 4,144,737 | A | 3/1979 | Izraeli | |
| 4,768,258 | A | 9/1988 | Langenstein | |
| 4,964,216 | A | 10/1990 | Gosselin | |
| 5,014,432 | A | 5/1991 | Putsch et al. | |
| 5,261,303 | A | 11/1993 | Strippgen | |
| 5,404,616 | A | 4/1995 | Carmien | |
| 5,581,838 | A | 12/1996 | Rocco | |
| 5,862,597 | A | 1/1999 | Juros | |
| 5,933,965 | A | 8/1999 | Linden et al. | |
| 5,974,670 | A | 11/1999 | Hsieh | |
| 5,988,027 | A | 11/1999 | Lenox | |
| 6,085,425 | A | 7/2000 | Weber | |
| 6,226,874 | B1 | 5/2001 | Jansson | |
| 6,370,992 | B1 | 4/2002 | Shih-Kuei | |
| 6,546,596 | B2 | 4/2003 | Grote | |
| 6,854,365 | B1 | 2/2005 | Petts | |
| 6,883,208 | B1 | 4/2005 | Huang | |
| 6,959,629 | B2 | 11/2005 | Hsien | |
| 7,231,718 | B2 | 6/2007 | Outen | |
| 7,415,911 | B2 | 8/2008 | Cole | |
| 7,520,199 | B2 | 4/2009 | Stawarski | |
| 7,628,382 | B2 | 12/2009 | Cole | |
| 7,682,099 | B2 | 3/2010 | Cole | |
| 7,694,387 | B1 | 4/2010 | Huang | |
| 7,717,017 | B2 | 5/2010 | McBride et al. | |
| 7,774,901 | B1 | 8/2010 | Huang | |
| 7,987,744 | B2 | 8/2011 | Hanning et al. | |
| 8,132,308 | B2 | 3/2012 | Foley | |
| 8,307,557 | B1 | 11/2012 | Rodgers | |
| 8,479,399 | B2 | 7/2013 | Putsch | |
| 8,683,657 | B2 | 4/2014 | Lin | |
| 8,708,312 | B2 | 4/2014 | Stawarski | |
| 9,205,549 | B1 | 12/2015 | Lin | |
| 9,302,385 | B2 | 4/2016 | Su | |
| 9,744,662 | B1 | 8/2017 | Henry | |
| 10,201,131 | B1 | 2/2019 | Huang | |
| 10,343,295 | B2 | 7/2019 | Feuerstein et al. | |
| 11,090,822 | B2 * | 8/2021 | Feuerstein | B25G 1/043 |
| 11,745,326 | B2 * | 9/2023 | Blumenthal | B25G 1/063 30/192 |
| 2002/0073557 | A1 | 6/2002 | Huang | |
| 2003/0123926 | A1 | 7/2003 | Lin | |
| 2004/0018047 | A1 | 1/2004 | Linden et al. | |
| 2004/0181904 | A1 | 9/2004 | Steltzer et al. | |
| 2005/0204873 | A1 | 9/2005 | Ana | |
| 2006/0027053 | A1 | 2/2006 | Hsien | |
| 2006/0090613 | A1 | 5/2006 | Hsieh | |
| 2006/0156554 | A1 | 7/2006 | Lin | |
| 2006/0168818 | A1 | 8/2006 | Outen | |
| 2007/0262597 | A1 | 11/2007 | Ramos | |
| 2008/0016700 | A1 | 1/2008 | Hernandez et al. | |
| 2008/0085150 | A1 | 4/2008 | Wang | |
| 2008/0155785 | A1 | 7/2008 | Chen | |
| 2008/0276429 | A1 | 11/2008 | Bukovitz et al. | |
| 2009/0007733 | A1 | 1/2009 | Robinson et al. | |
| 2009/0090224 | A1 | 4/2009 | Lin | |
| 2009/0241614 | A1 | 10/2009 | Hahn | |
| 2010/0175512 | A1 | 7/2010 | Zhang et al. | |
| 2010/0326248 | A1 | 12/2010 | Owoc | |
| 2011/0000026 | A1 | 1/2011 | Shan | |
| 2012/0144626 | A1 | 6/2012 | Lanz | |
| 2012/0174417 | A1 | 7/2012 | Huang | |
| 2012/0304473 | A1 | 12/2012 | Panosian et al. | |
| 2013/0047441 | A1 | 2/2013 | Schultes et al. | |
| 2013/0185945 | A1 | 7/2013 | Wang | |
| 2013/0205601 | A1 | 8/2013 | Wu | |
| 2014/0059808 | A1 | 3/2014 | Lin | |
| 2017/0165852 | A1 | 6/2017 | Feuerstein et al. | |
| 2019/0291287 | A1 | 9/2019 | Feuerstein et al. | |
| 2021/0339411 | A1 * | 11/2021 | Feuerstein | B26B 17/02 |
| 2023/0347533 | A1 * | 11/2023 | Marich | B26B 17/02 |

FOREIGN PATENT DOCUMENTS

| | | |
|---|---|---|
| CN | 101543988 | 8/2012 |
| CN | 302669543 | 12/2013 |
| DE | 202004013591 | 12/2004 |
| DE | 102005050607 | 6/2006 |
| DE | 202008008012 | 6/2009 |
| EP | 0 783 935 | 7/1997 |
| EP | 1366865 | 12/2003 |
| EP | 2269441 | 1/2011 |
| EP | 2682233 | 1/2014 |
| FR | 2882676 | 1/2007 |
| GB | 1098292 | 1/1968 |
| GB | 1212429 | 11/1970 |
| GB | 2369794 | 11/2003 |
| TW | 547585 | 8/2003 |
| TW | M277257 | 10/2005 |
| TW | 201102237 | 1/2011 |
| TW | I351344 | 11/2011 |
| WO | WO9505271 | 2/1995 |
| WO | WO2013020335 | 2/2013 |
| WO | WO2015168818 | 11/2015 |
| WO | WO2017/100567 | 6/2017 |

OTHER PUBLICATIONS

"Greenlee HDFBC18 Heavy-Duty Bolt Cutter with Fiberglass Handles, 18-Inch", Amazon.com, (Jul. 27, 2009), 4 pages, http://www.amazon.com/Greenlee-HDFBC18-HeavyDutyFiberglassHandles/dp/B00125FAS4/ref=sr_1_8?s=hi&ie=UTF8&qid=1438028751&sr=1-8&keywo.

"Klein Tools 63336 36-Inch Bolt Cutter—Steel Handles", Amazon.com, (Jul. 18, 2004), 5 pages, http://www.amazon.com/KleinTools6333636InchCutter/dp/B0002DOJWO.

Johnson, Benjamen, "Knipex Concrete Mesh Cutter", toolmonger.com, (Apr. 8, 2009), 3 pages, Toolmonger, http://toolmonger.com/2009/04/08/knipexconcretemeshcutter/.

"Kobalt 24-in Bolt Cutter", Lowes.com, (2015), 1 page, http://www.lowes.com/pd_4646021687855764 _?productId=50069703&pl=1&Ntt=kobalt+bolt+cutter.

"Bolt Cutters", nuplacorp.com, (2015), 1 page, Nupla Corp, Sun Valley, CA, http://www.nuplacorp.com/product.php?id=199.

"Olympia Tools 39-124 Power Grip Bolt Cutter, 24-Inch", Amazon.com, (Oct. 29, 2013), 5 pages, http://www.amazon.com/OlympiaTools39124Cutter24Inch/dp/B00GACDKAO/ref=Ip_553176_114?s=powerhandtools&ie=UTF8&qid=1438028067&sr =. . . .

"Ridgid 14223 S24 Bolt Cutter", Amazon.com, (Dec. 27, 2006), 6 pages, http://www.amazon.com/Ridgid14223S24BoltCutter/dp/B00140X8W2.

"Salisbury Insulated Tool, Bolt Cutters 42" S210590", Salisburyonline.com, (2015), 3 pages, SalisburyOnline, http://www.salisburyonline.com/p1337salisburyinsulatedtoolboltcutters42s210590.aspx?gclid=Cj0KEQjwrdetBRCJg92s44SB77IBEiQAEIWmVZXi9frd3 . . . .

"TEKTON 3410 24-Inch Bolt Cutter", Amazon.com, (Dec. 5, 2007), 8 pages, http://www.amazon.com/TEKTON341024InchBoltCutter/dp/B000NPTSRG.

"ToughBuilt TB-BC-01001A 14-Inches ToughBuilt Compact Bolt Cutter", Amazon.com, (Jul. 1, 2011), 5 pages, http://www.amazon.

(56) References Cited

OTHER PUBLICATIONS com/ToughBuiltTBBC01001A14InchesCompactCutter/dp/B00582WQA2/ref=Ip_553176_1_18?s=powerhandtools&ie=UTF8&qid=1 . . . .

"Toughbuilt foldable, compact bolt cutters", Press Release, (Sep. 6, 2010), 2 pages, vol. 36 Issue 9, Lebhar-Friedman Inc., United States.

"Workforce 24 in. Bolt Cutters-9003H", Homedepot.com, (2015), 2 pages, http://www.homedepot.com/p/Workforce24inBoltCutters9003H/100015010.

"Apex Product Line", apexhandtools.com, (2015), 1 page, Apex Tool Group, LLC, http://www.apexhandtools.com/search/search_catalog.cfm.

"Bolt Cutter 13mm", tool rental advertisement, (2015), 5 pages, Belmont Hire, Australia, http://www. belmonthire.com.au/products/cutting/boltcutter13mm/.

"Alti Bolt Cutter 24 inch", cuttingedgetactical.com, (2006), 2 pages, Cutting Edge Tactical, http://www.cuttingedgetactical.com/altiboltcutter24.aspx.

* cited by examiner

BOLT CUTTER

CROSS-REFERENCE TO RELATED APPLICATIONS

This application is a continuation of U.S. application Ser. No. 16/436,563, now U.S. Pat. No. 11,090,822, filed Jun. 10, 2019, which is a continuation of U.S. application Ser. No. 15/374,031, now U.S. Pat. No. 10,343,295, filed Dec. 9, 2016, which claims priority to U.S. Provisional Patent Application No. 62/265,536, filed on Dec. 10, 2015, the entire contents of each of which are incorporated herein by reference.

FIELD OF THE INVENTION

The present invention relates to a cutter, and more specifically to an adjustable bolt cutters.

BACKGROUND OF THE INVENTION

There are various hand tools known in the art for cutting a workpiece (e.g., a bolt). These cutters utilize mechanical advantage to increase the user's ability to apply a cutting force on the workpiece, but often these designs are met with size constraints.

SUMMARY OF THE INVENTION

The invention provides, in one aspect, a cutter including a cutting head and an adjustable handle pivotally coupled to the cutting head. The adjustable handle includes a first adjustment mechanism to change a length the adjustable handle extends from the cutting head. The adjustable handle further includes a second adjustment mechanism to change the position of the adjustable handle with respect to the cutting head.

The invention provides, in another aspect, a cutter including a cutting head with a first bore and an adjustable handle pivotally coupled to the cutting head. The adjustable handle includes a second bore and an angle adjustment assembly to change the position of the adjustable handle with respect to the first bore. The first bore and the second bore define an axis about which the adjustable handle pivots with respect to the cutting head. The angle adjustment assembly includes a plunger received within the first bore and the second bore. The plunger is movable between a locked position in which the adjustable handle is fixed with respect to then first bore and an unlocked position in which the adjustable handle is movable with respect to the first bore.

The invention provides, in another aspect, a cutter comprising a cutting head and a first handle coupled to the cutting head. The first handle extends a first length from the cutting head and extends from a central axis at a first angle. The cutter also includes a second handle coupled to the cutting head. The second handle extends a second length from the cutting head, and the second length is larger than the first length. The second handle also extends from the central axis at a second angle, and the second angle is larger than the first angle.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
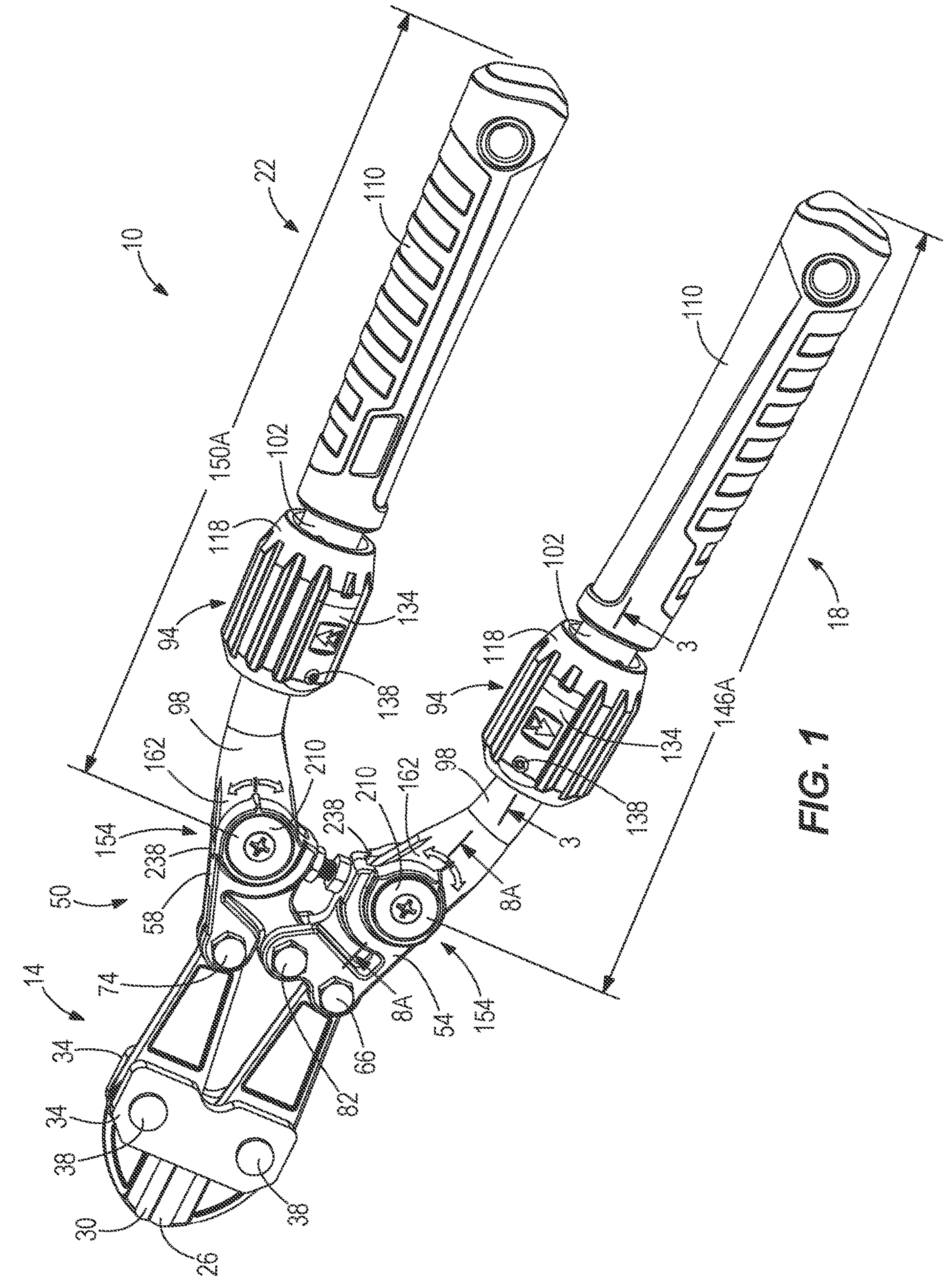
FIG. 1 is a perspective view of a bolt cutter with adjustable handles including length adjustment assemblies and angle adjustment assemblies in accordance with an embodiment of the invention.
Figure 2:
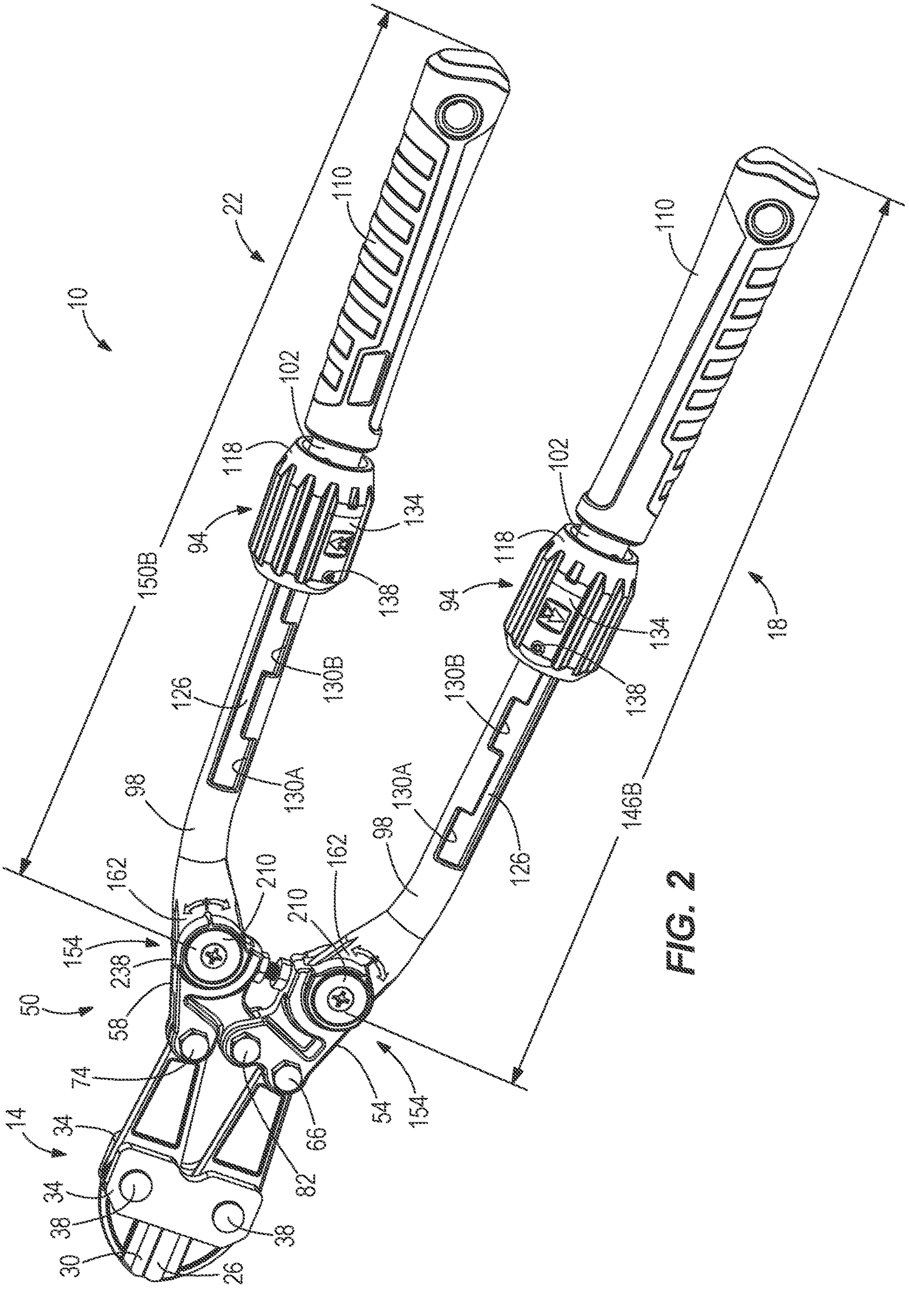
FIG. 2 is a perspective view of the bolt cutter of FIG. 1, showing the adjustable handles in an extended position.
Figure 9:
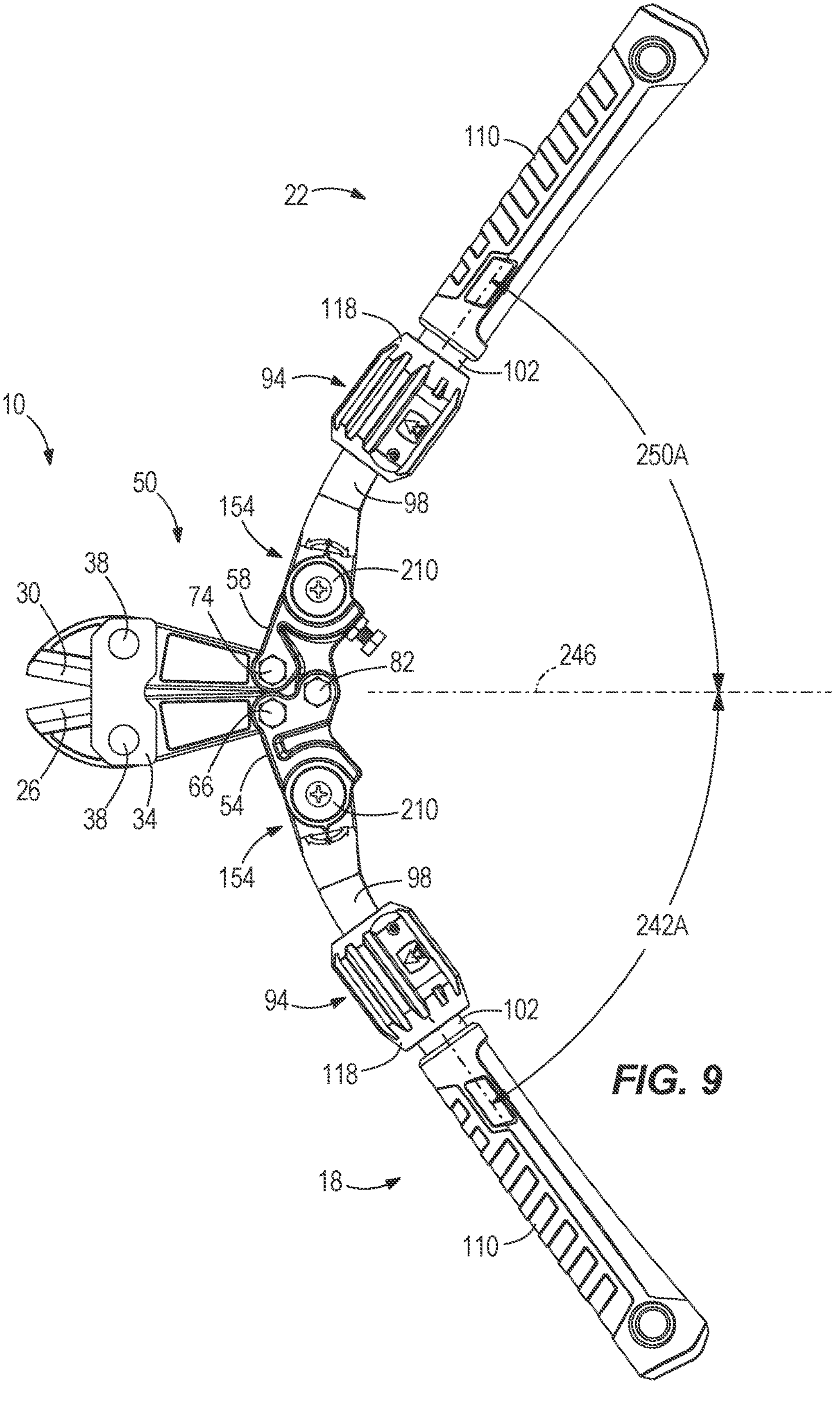
FIG. 9 is a side view of the bolt cutter of FIG. 1, in a first configuration.

With reference to FIGS. 1-2, a bolt cutter 10 is illustrated including a cutting head 14, a first adjustable handle 18, and a second adjustable handle 22. The cutting head 14 includes a first cutting blade 26 and a second cutting blade 30 coupled together by plates 34 and corresponding fasteners 38. The first cutting blade 26 and the second cutting blade 30 are pivotable about a pin 42 (FIG. 6) that is sandwiched between the plates 34. The pin 42 allows the first and second cutting blades 26, 30 to move with respect to each other about an axis 46 (FIG. 6) defined by the pin 42. Specifically, the first and second cutting blades 26, 30 are movable between an open position (i.e., with the cutting portions of the blades 26, 30 spaced apart; FIG. 9) and a closed position (i.e., with the cutting portions of the blades 26, 30 together; FIG. 1). As the first and second blades 26, 30 are moved from the open position to the closed position; an object (e.g., chains, padlocks, bolts, etc.) positioned between the blades 26, 30 is cut or sheared.

Figure 6:
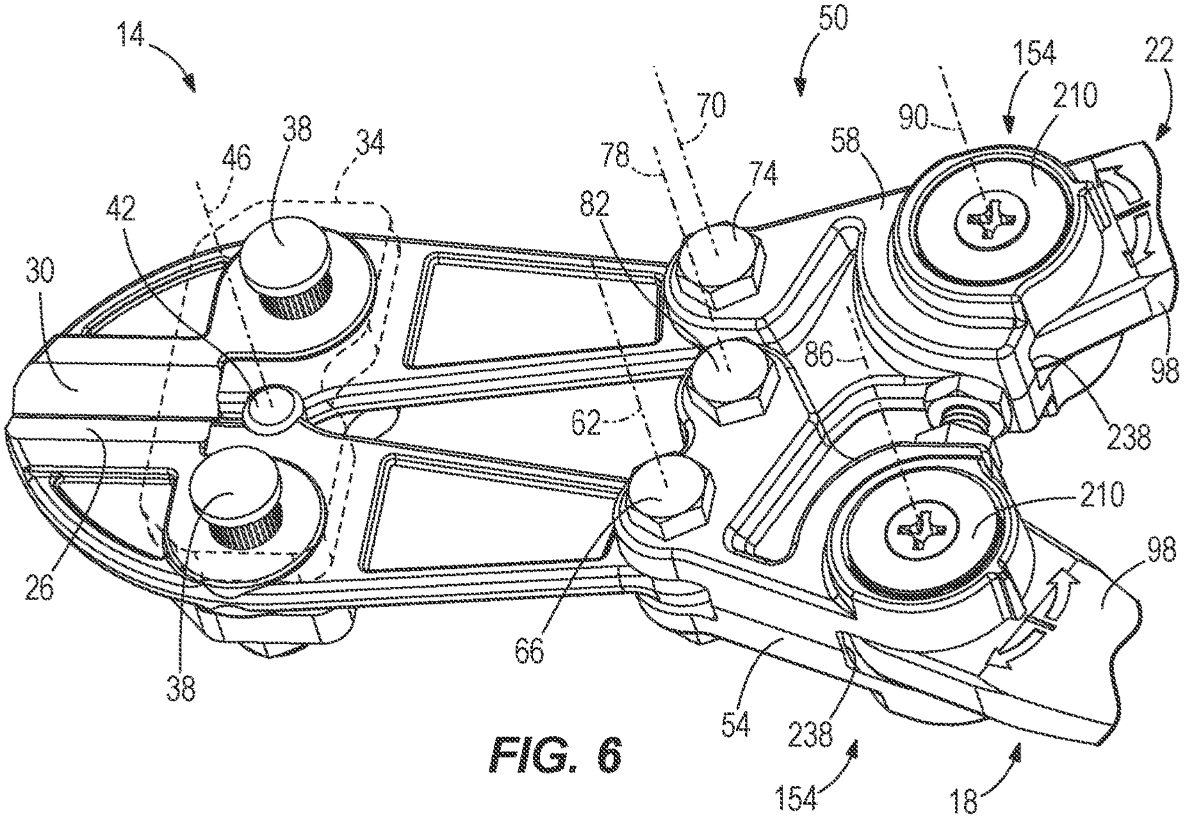
FIG. 6 is a partial perspective view of the bolt cutter of FIG. 1, with portions removed for clarity.

With reference to FIG. 6, the cutting head 14 further includes a compound hinge 50 to increase the cutting force of the blades 26, 30 resulting from the force exerted by a user on the adjustable handles 18, 22. In particular, the compound hinge 50 includes a first link 54 coupled to the first cutting blade 26 and a second link 58 coupled to the second cutting blade 30. In particular, the first link 54 is pivotally coupled to the first cutting blade 26 about a pivot axis 62 defined by a fastener 66, and the second link 58 is pivotally coupled to the second cutting blade 30 about a pivot axis 70 defined by a fastener 74. The first link 54 and the second link 58 are also pivotally coupled to each other about a pivot axis 78 defined by a fastener 82. As explained in greater detail below, the first adjustable handle 18 is pivotally coupled to the first link 54 about a pivot axis 86 and the second adjustable handle 22 is pivotally coupled to the second link 58 about a pivot axis 90.

Figure 3:
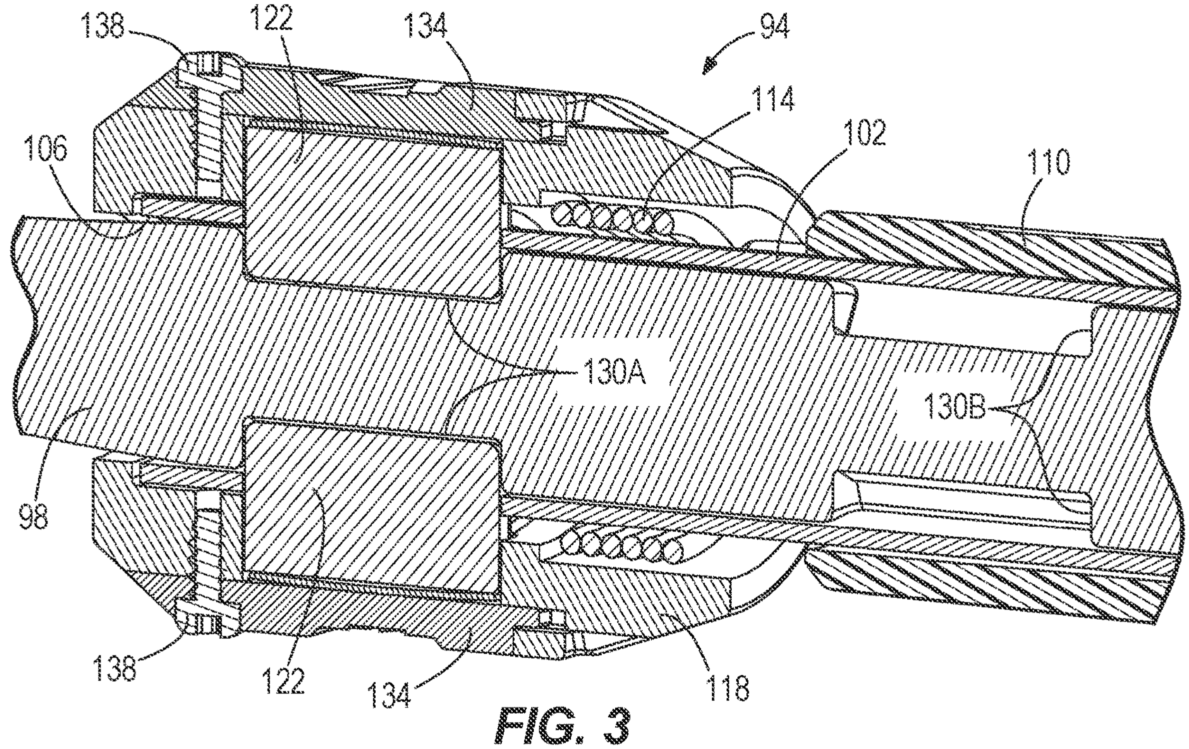
FIG. 3 is a cross-sectional view of the length adjustment assembly of FIG. 1, taken along lines 3-3 shown in FIG. 1.
Figure 4:
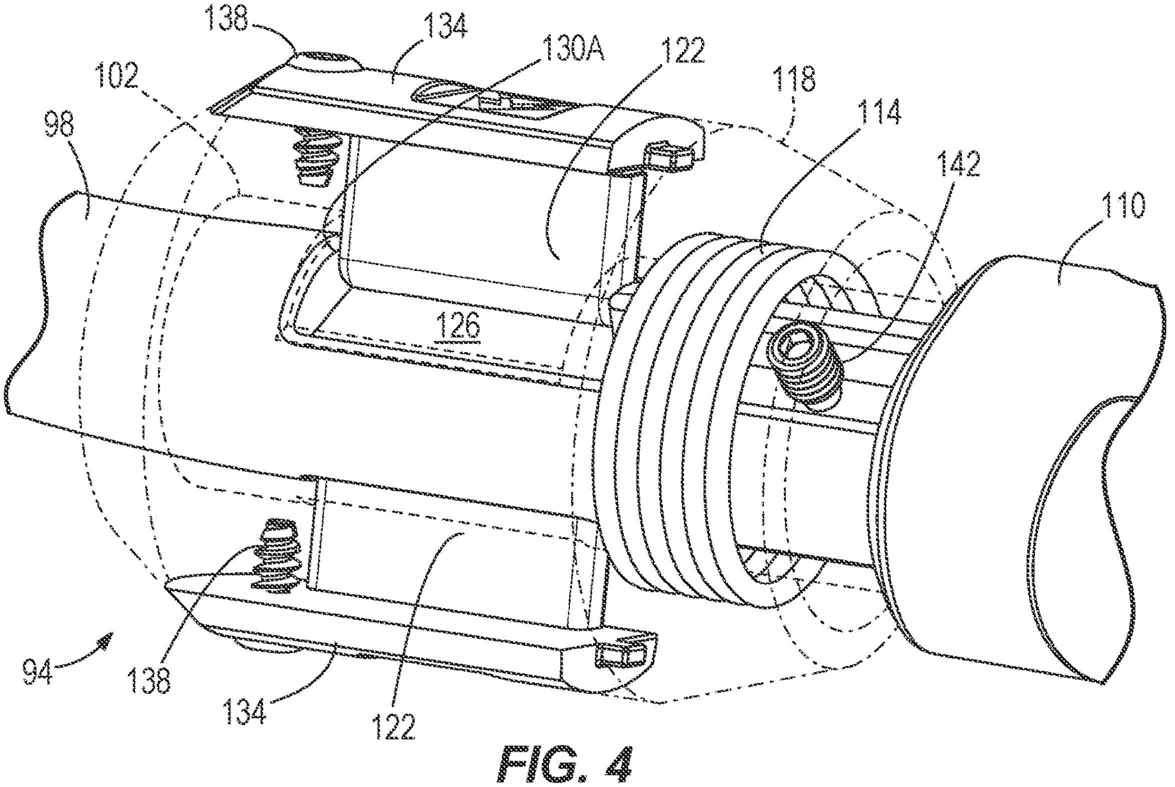
FIG. 4 is a partial perspective view of the length adjustment assembly of FIG. 1, with portions removed for clarity.

With reference to FIGS. 1-5, the first and second adjustable handles 18, 22 each include a length adjustment assembly 94 (i.e., a first adjustment assembly) to allow a user to change the length the adjustable handles 18, 22 extend from the cutting head 14. Specifically, the first and second adjustable handles 18, 22 each include a first handle member 98 and a second handle member 102 that telescopically receives the first handle member 98 within a bore 106 formed in the second handle member 102 (FIG. 3). In the illustrated embodiment, the second handle member 102 also includes a grip portion 110, formed by, for example, an over-molding process. With reference to FIGS. 3 and 4, the length adjustment assembly 94 couples the first handle member 98 to the second handle member 102. In particular, the length adjustment assembly 94 is movable between a locked position (FIGS. 3-4) in which the first handle member 98 is fixed relative to the second handle member 102, and an unlocked position (i.e., a released position) (not shown) in which the first handle member 98 is movable with respect to the second handle member 102. The length adjustment assembly 94 includes a spring 114 (i.e., a biasing member) to bias the length adjustment assembly 94 toward the locked position. In the illustrated embodiment, the spring 114 is a torsional spring.

Figure 5:
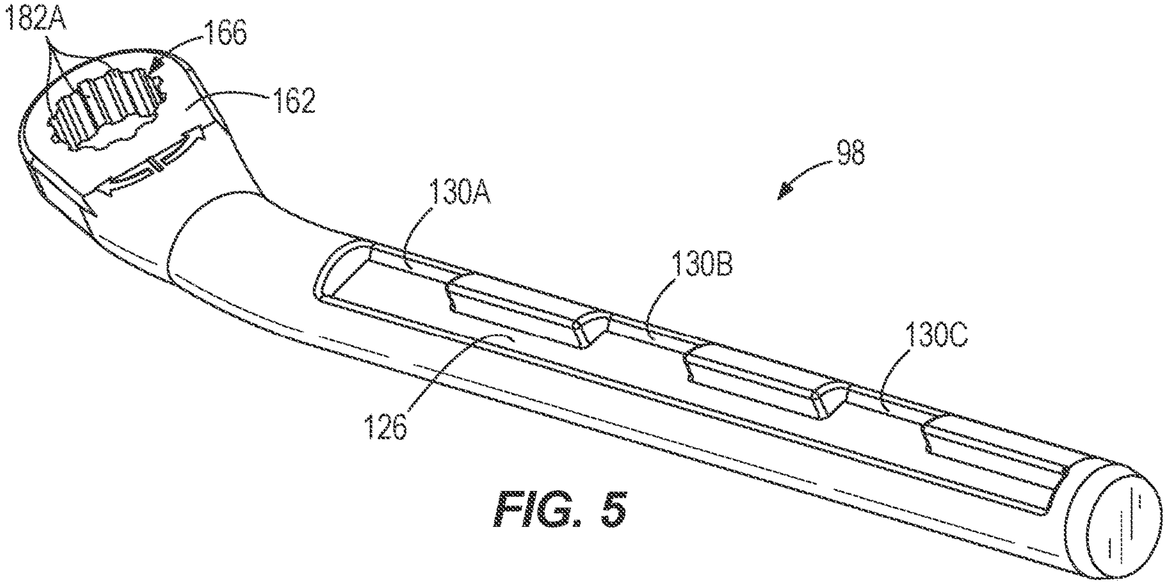
FIG. 5 is a perspective view of a handle member of the bolt cutter of FIG. 1.

With continued reference to FIGS. 3 and 4, the length adjustment assembly includes a rotatable collar 118 (i.e., a movable lock) with two radially inwardly extending protrusions 122. In the illustrated embodiment, the protrusions 122 are spaced approximately 180 degrees apart. With reference to FIG. 5, a slot 126 is formed on a first side of the first handle member 94, and a similar slot 126 is formed on an opposite, second side of the first handle member 94. The protrusions 122 are received within the corresponding slots 126. Each of the slots 126 includes three grooves 130A, 130B, 130C to receive the protrusion 122 when the length adjustment assembly 94 is in the locked position. Each of the grooves 130A, 130B, 130C corresponds to a different length the adjustable handle 94 extends from the cutting head 14. The spring 114 biases the collar 118 to rotate in order to urge the protrusions 122 into one of the grooves 130A-130C formed in the telescoping first handle member 98. When the protrusion 122 is received within the groove 130A-130C, the first handle member 98 is locked with respect to the second handle member 102. In the illustrated embodiment, the rotatable collar 118 is mounted for rotation about the second handle member 102. In alternative embodiments, the rotatable collar 118 is mounted for rotation about the first handle member 98 and the slot 126 is formed on the second handle member 102. In further alternative embodiments, the second handle member 102 may be telescopically received within the first handle member 98.

With continued reference to FIGS. 3 and 4, the protrusions 122 are formed as part of a removable cover 134 that is secured to the rotatable collar 118 by a fastener 138. In the illustrated embodiment, the removable cover 134 includes indicia indicating which direction the user needs to rotate the collar 118 in order to unlock the length adjustment assembly 94. A fastener 142 (FIG. 4) is secured to the second handle member 102 and is received within the slot 126 in order to prevent the first handle member 98 from being completely removed from the bore 106 of the second handle member 102.

Figure 11:
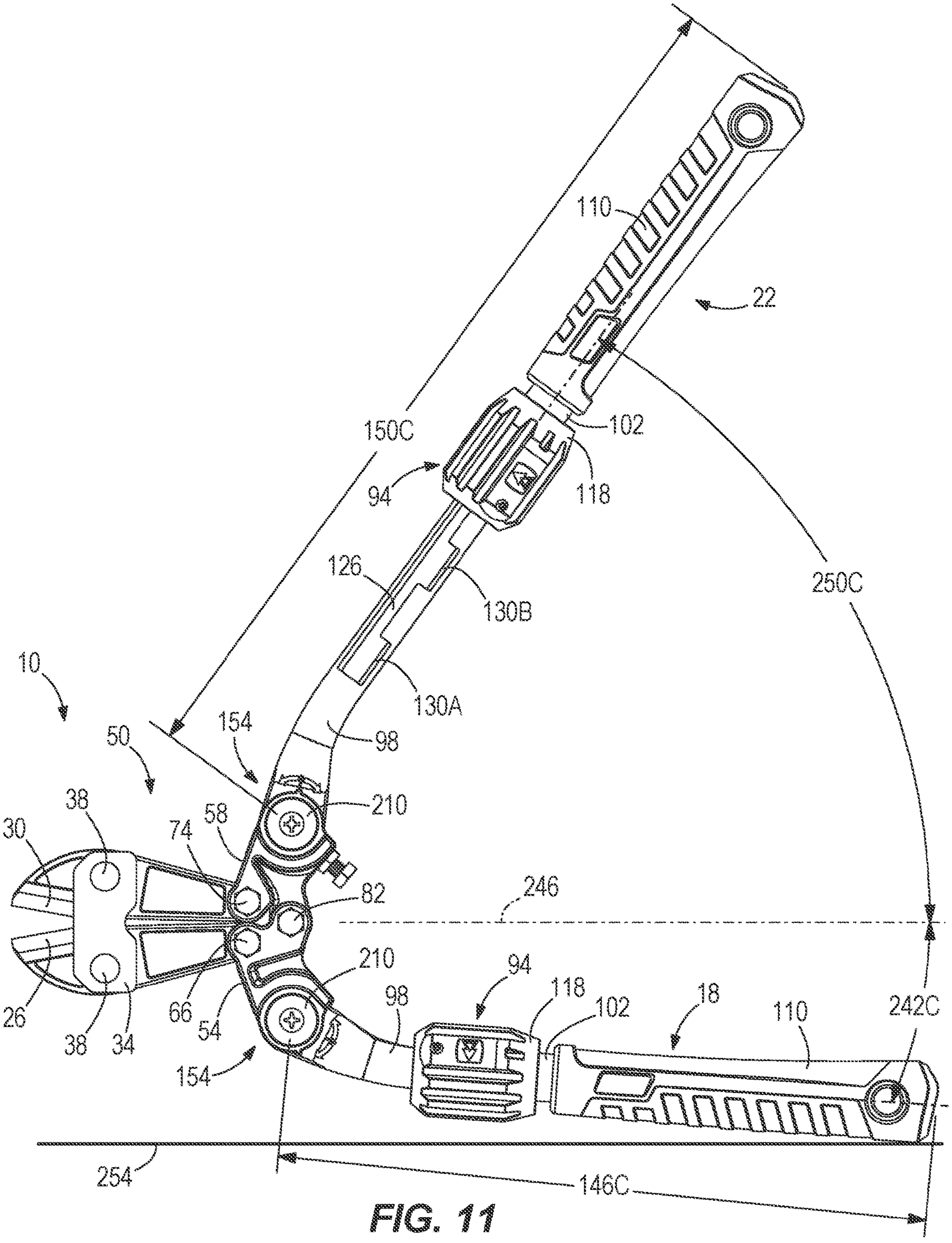
FIG. 11 is a side view of the bolt cutter of FIG. 1, in a third configuration.

To adjust the length of the adjustable handle 18, 22 a user rotates the collar 118, removing the protrusions 122 from the grooves 130A-130C to once again allow the telescoping first handle member 98 to slide relative to the second handle member 102. The adjustable handles 18, 22 define a length 146, 150, respectively, that the handles 18, 22 extend from the cutting head 14. The length adjustment assembly 94 selectively locks and unlocks the telescoping first handle members 98 in order to adjust the lengths 146, 150. For example, the protrusions 122 are received within the first grooves 130A to secure the adjustable handles 18, 22 with a first length 146A, 150A (FIG. 1), and the protrusions 122 are received within the third grooves 130C to secure the adjustable handles 18, 22 with a second length 146B, 150B (FIG. 2) (i.e., an extended position). The second length 146B, 150B is longer than the first length 146A, 150A. The length 146 of the first adjustable handle 18 can be adjusted to be shorter or longer than the length 150 of the second adjustable handle 22 (see, for example, FIG. 11). In other words, the length adjustment assemblies 94 are operable independent of each other. Increasing the lengths 146, 150 of the adjustable handles 18, 22 increases the mechanical advantage for the user (i.e., less input force is required by the user to achieve the same cutting force).

Figure 7:
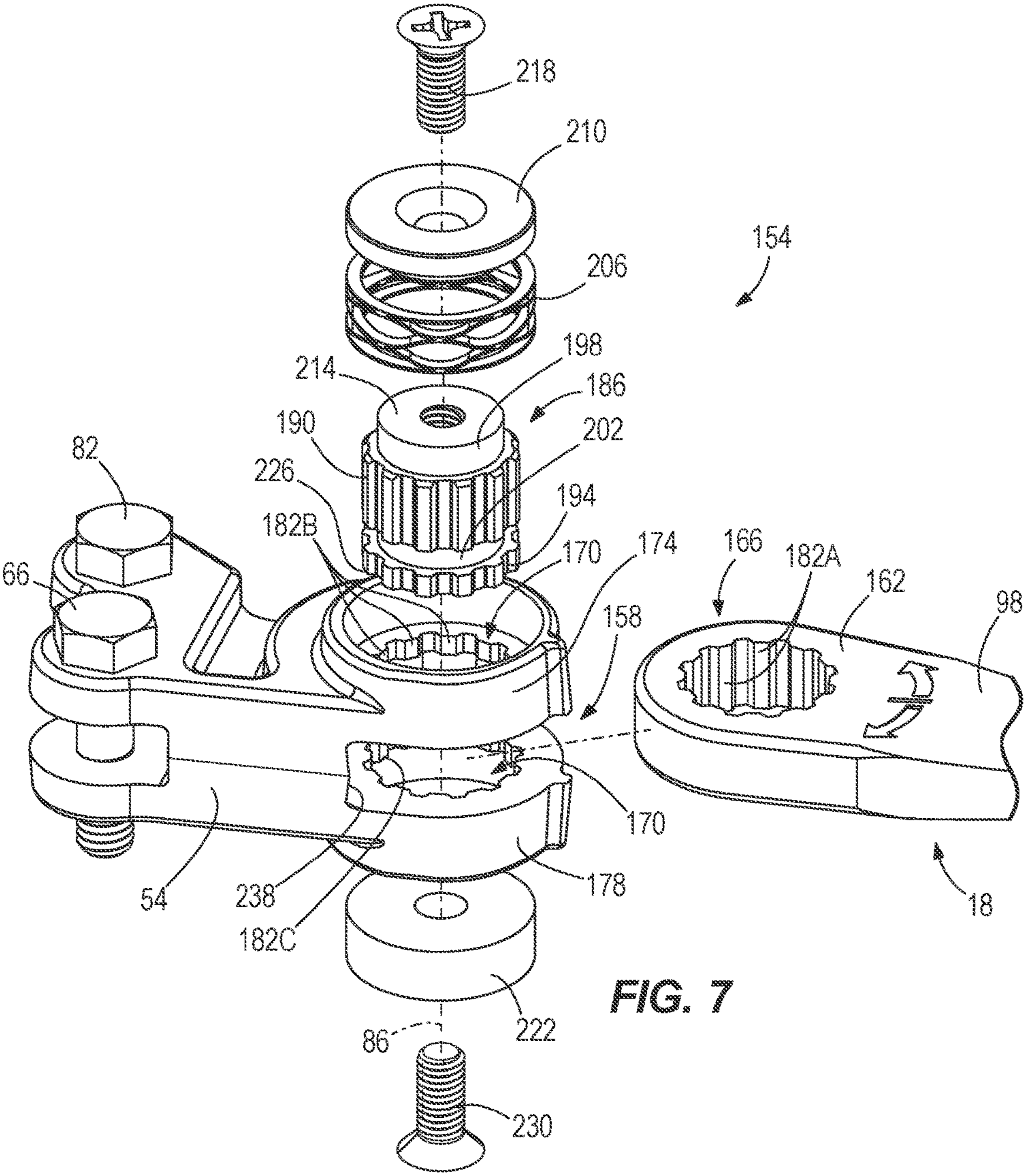
FIG. 7 is an exploded view of the angle adjustment assembly of FIG. 1.

With reference to FIGS. 6-8B, the first and second adjustable handles 18, 22 each include an angle adjustment assembly 154 (i.e., a second adjustment assembly) to allow a user to change the angular position of the adjustable handles 18, 22 with respect to the cutting head 14. In other words, the angular position of the first and second adjustable handles 18, 22 can be adjusted with respect to the cutting head 14, without movement of the cutting head 14, by actuation of the angle adjustment assembly 154. With reference to FIG. 7, the first link 54 of the hinge 50 defines a slot 158 into which an end 162 of the first handle member 98 is received. The first handle member 98 includes a handle bore 166 and the hinge 50 of the cutting head 14 includes a hinge bore 170 formed in the first link 54. Specifically, the hinge bore 170 is formed in a first flange 174 and a second flange 178 of the first link 54. The first flange 174 and the second flange 178 at least partially define the slot 158. The handle bore 166 and the hinge bore 170 define the pivot axis 86, 90 about which the adjustable handle 18, 22 pivots with respect to the hinge 50 of the cutting head 14. In particular, the angle adjustment assembly 154 allows a user to change the position of the adjustable handle 18, 22 with respect to the hinge bore 170. The inner circumferential surface of the handle bore 166 and the hinge bore 170 each include teeth 182. Specifically, the handle bore 166 includes teeth 182A, and the hinge bore 170 includes teeth 182B formed in the first flange 174 and teeth 182C formed in the second flange 178.

With reference to FIG. 7, the angle adjustment assembly 154 includes a plunger 186 received within the handle bore 166 and the hinge bore 170. The plunger 186 includes a first toothed section 190, a second toothed section 194, a first smooth section 198 (i.e., non-toothed sections), and a second smooth section 202. In the illustrated embodiment, the second smooth section 202 is positioned between the first toothed section 190 and the second toothed section 194. The angle adjustment assembly 154 further includes a spring 206 (i.e., a biasing member). In the illustrated embodiment, the spring 206 includes spring washers. The angle adjustment assembly 154 further includes a button 210 secured to the plunger 186 at a first end 214 by a fastener 218, and a plug 222 secured to the plunger 186 at a second, opposite end 226 by a fastener 230.

Figure 8A:
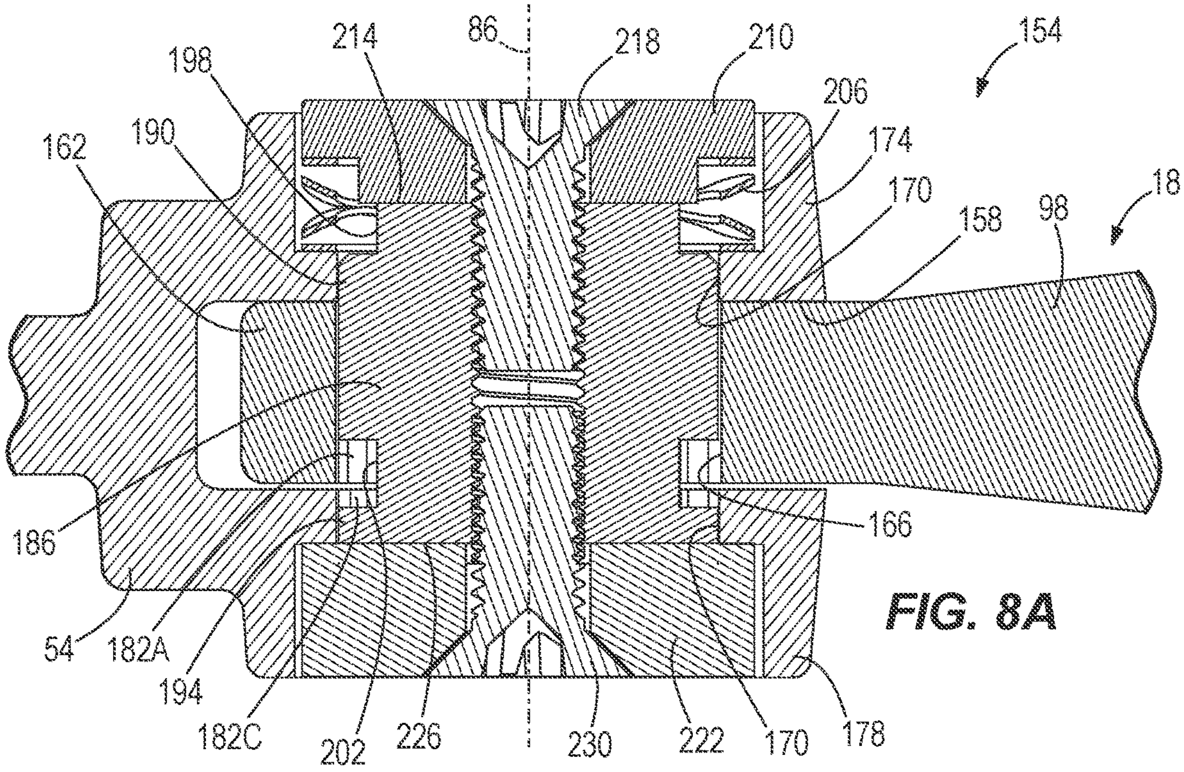
FIG. 8A is a cross-sectional view of the angle adjustment assembly of FIG. 1 in a locked position, taken along lines 8A-8A shown in FIG. 1.
Figure 8B:
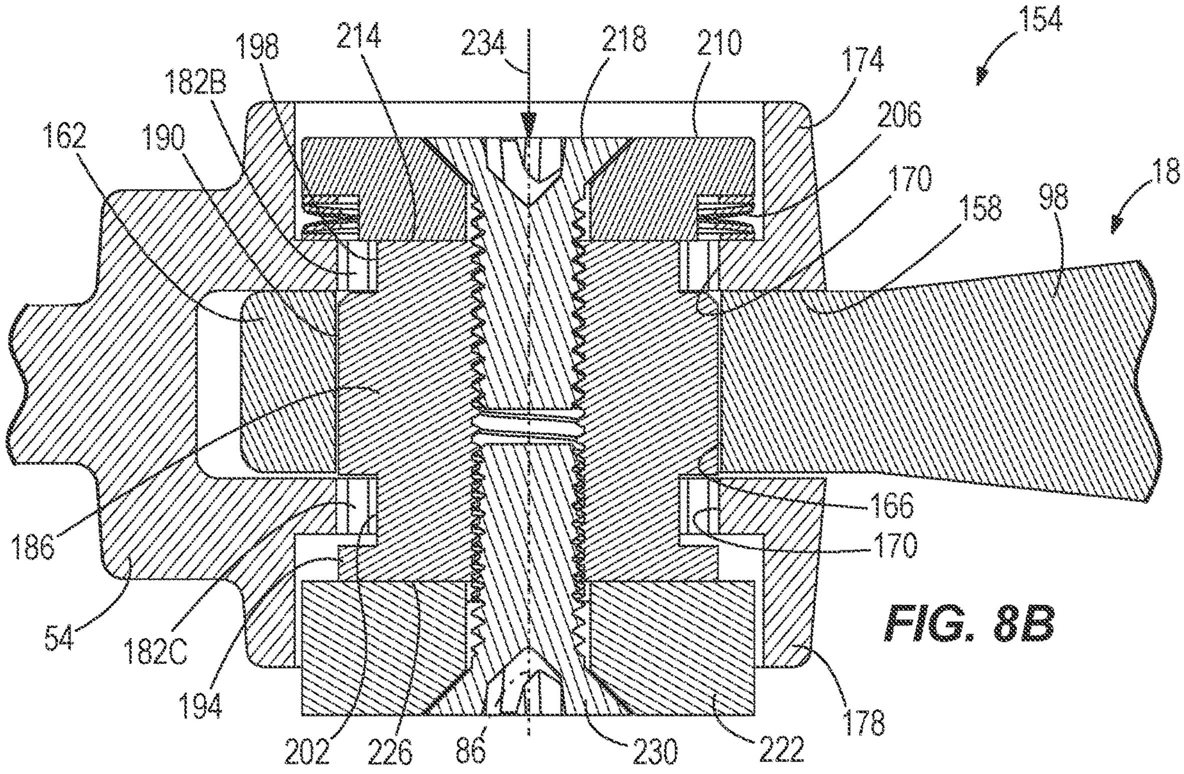
FIG. 8B is a cross-sectional view of the angle adjustment assembly of FIG. 1 in an unlocked position, taken along lines 8A-8A shown in FIG. 1.

With continued reference to FIGS. 8A and 8B, the plunger 186 is received within the handle bore 166 and the hinge bore 170. In the illustrated embodiment, the spring 206 is positioned between the plunger 186 and the button 210 such that the plunger 186 is biased into the position shown in FIG. 8A. The position shown in FIG. 8A is a locked position with the toothed sections 190, 194 of the plunger 186 in engagement with the teeth 182A, 182B, 182C formed in the bores 166, 170. In particular, the first toothed section 190 engages both the first handle member 98 and the first flange 174, and the second toothed section 194 engages the second flange 178. The position shown in FIG. 8B is an unlocked position (i.e., a released position) with the toothed sections 190, 194 of the plunger 186 disengaged from (i.e., removed from, misaligned with, etc.) the teeth 182B, 182C in the hinge bore 170 (i.e., disengaged from the first flange 174 and the second flange 178) such that the smooth sections 198, 202 of the plunger 186 are aligned with the first flange 174 and the second flange 178. In particular, the first smooth section 198 is aligned with the teeth 182B in the hinge bore 170 of the first flange 174 and the second smooth section 202 is aligned with the teeth 182C in the hinge bore 170 of the second flange 178. In the unlocked position of FIG. 8B, the first toothed section 190 remains engaged with the teeth 182A formed in the handle bore 166 of the first handle member 98, but the first handle member 98 is free to rotate about the pivot axis 86, 90 with respect to the hinge 50 to adjust the angular position of the handles 18, 22 without imparting motion to the cutting head 14.

In other words, when the plunger 186 is in the locked position (FIG. 8A) the first handle member 98 of the adjustable handles 18, 22 is fixed with respect to the hinge bore 170, and when the plunger 186 is in the unlocked position (FIG. 8B) the first handle member 98 is movable with respect to the hinge bore 170. In the locked position, the toothed sections 190, 194 of the plunger 186 engage the teeth 182B, 182C of the hinge bore 170. In the unlocked position, the smooth sections 198, 202 of the plunger 186 are aligned with the hinge bore 170 while the toothed section 190 of the plunger 186 remains engaged with the handle bore 166. To adjust the angular position of the handles 18, 22 with respect to the cutting head 14, a user depresses the button 210 in the direction 234 (FIG. 8B) along the axis 86, 90 to overcome the force of the springs 206, sliding the plunger 186 within the bores 166, 170. With the button 210 depressed, the angle adjustment assembly 154 is in the unlocked position and the handles 18, 22 can be angularly adjusted about the pivot axis 86, 90. Once the handles 18, 22 are in the desired angular position, the user releases the button 210 and the spring 206 returns the toothed sections 190, 194 into engagement with the hinge bore 170 (i.e., the locked position, FIG. 8A). The angular range of adjustment for each of the adjustable handles 18, 22 is approximately 180 degrees. In alternative embodiments, the angular range of adjustment of each adjustable handle is no less than approximately 270 degrees. In the illustrated embodiment, the angular range of adjustment is limited by the first handle member 98 contacting end portions 238 of the slot 126 on the links 54, 58.

Figure 10:
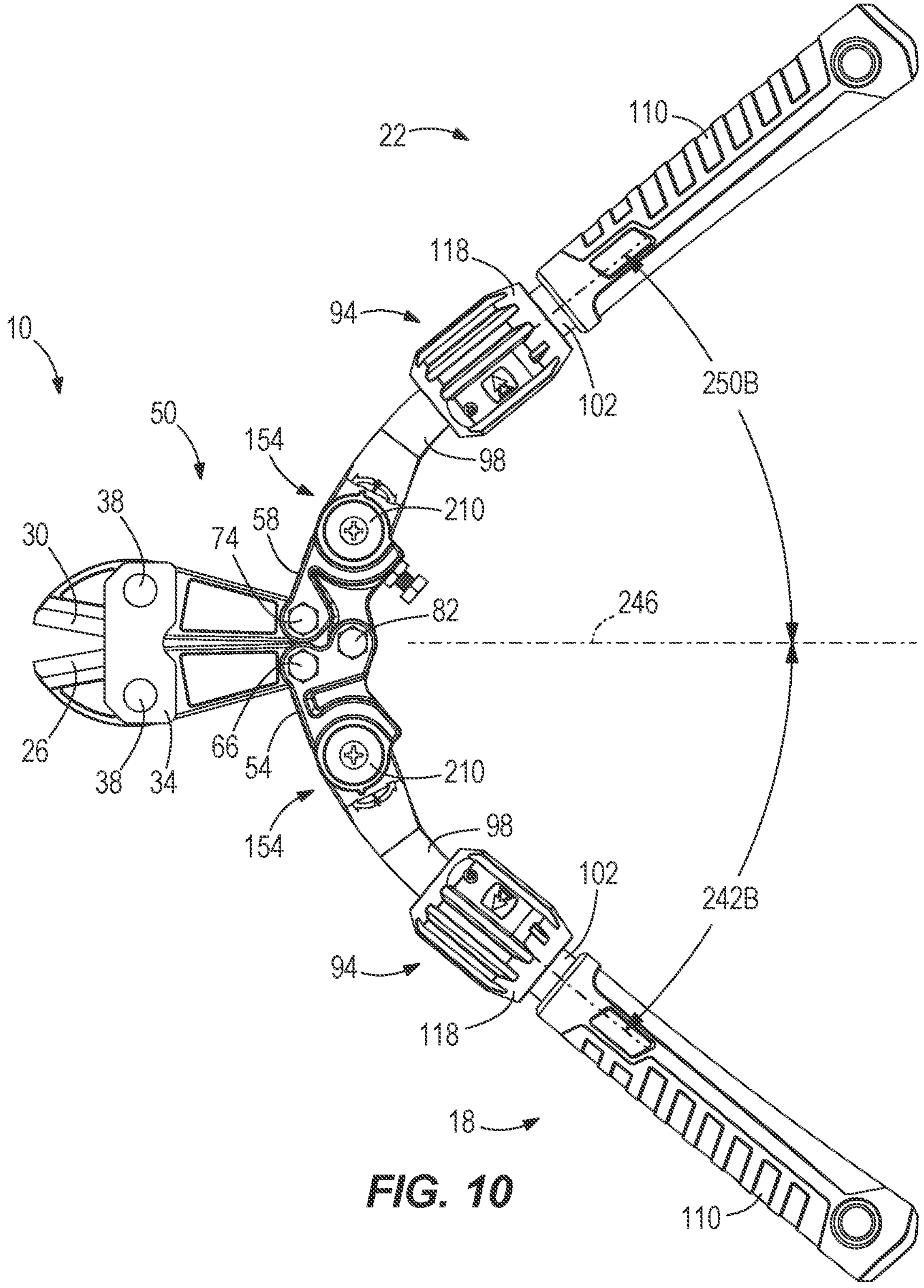
FIG. 10 is a side view of the bolt cutter of FIG. 1, in a second configuration.

The angle adjustment assembly 154 allows the adjustable handles 18, 22 to be locked at various angles with respect to the cutting head 14. In some embodiments, the ability to adjust the angular position allows for storing the handles 18, 22 in a compact, folded position by pivoting the handles to be oriented toward the cutting head 14 (i.e., the front of the tool), thereby minimizing the overall length of the tool. In addition, the adjustability of the angular position of the handles 18, 22 allows for setting the handles at a helpful position for cutting leverage. For example, at the start of a cut, with conventional bolt cutters, the handles are at their farthest apart, where a user has the least mechanical advantage (e.g., user has less strength when his or her arms are spread wide apart). In contrast, with the present invention, the handles 18, 22 can be adjusted such that they are closer together (while the blades 26, 30 of the cutting head 14 are still wide apart) and then the handles 18, 22 can be locked relative to the cutting head 14 in this closer angular configuration to allow the user to start the cut with his or her arms closer together to provide a better mechanical advantage. Then, once the cut has been started, the handles 18, 22 can, if desired, once again be pivoted relative to the cutting head 14 to allow the user to readjust the handles 18, 22 and finish the cut. This advantage is illustrated in FIGS. 9 and 10.

With reference to FIG. 9, the cutting head 14 is in the open position (i.e., with the cutting portions of the blades 26, 30 spaced apart) and the handles 18, 22 are spaced far apart. In particular, the handle 18 is positioned at an angle 242A with respect to a central axis 246 (i.e., the axis defined by the cutting portions of the blades 26, 30 when in the closed position) and the handle 22 is positioned at an angle 250A with respect to the central axis 246. With reference to FIG. 10, the user can adjust the position of the handles 18, 22 closer together with the angle adjustment assemblies 154, while keeping the cutting head 14 in the open position. More specifically, the handle 18 is now positioned at an angle 242B with respect to the central axis 246 and the handle 22 is positioned at an angle 250B with respect to the central axis 246. The angles 242B, 250B are smaller than the angles 242A, 250A. By using the bolt cutter 10 as configured in FIG. 10, the user can start the cut with his or her arms closer together to provide a better mechanical advantage and improved comfort. The angle 242 of the first adjustable handle 18 can be adjusted to be smaller or larger than the angle 250 of the second adjustable handle 22 (see, for example, FIG. 11). In other words, the length adjustment assemblies 154 are operable independent of each other.

Additionally, the angularly-adjustable handles 18, 22 allow for cutting in different configurations. For example, with reference to FIG. 11, the first handle 18 can extend a first length 146C from the cutting head 14 and extend from the central axis 246 at a first angle 242C. The second handle 22 can extend a second length 150C from the cutting head 14 and extend from the central axis 246 at a second angle 250C. The second length 150C is larger than the first length 146C and the second angle 250C is larger than the first angle 242C. In the configuration shown in FIG. 11, the second adjustable handle 22 can be pivoted approximately parallel to a work surface 254 such that a user can, for example, stand on the handle 22, and with the first adjustable handle 18 up in the air, the user can use a hand to apply pressure to second adjustable handle 18 to close the cutting head 14, making a cut. Additionally, the adjustable handles 18, 22 allow for cutting around corners from where the user is located.

Figure 12:
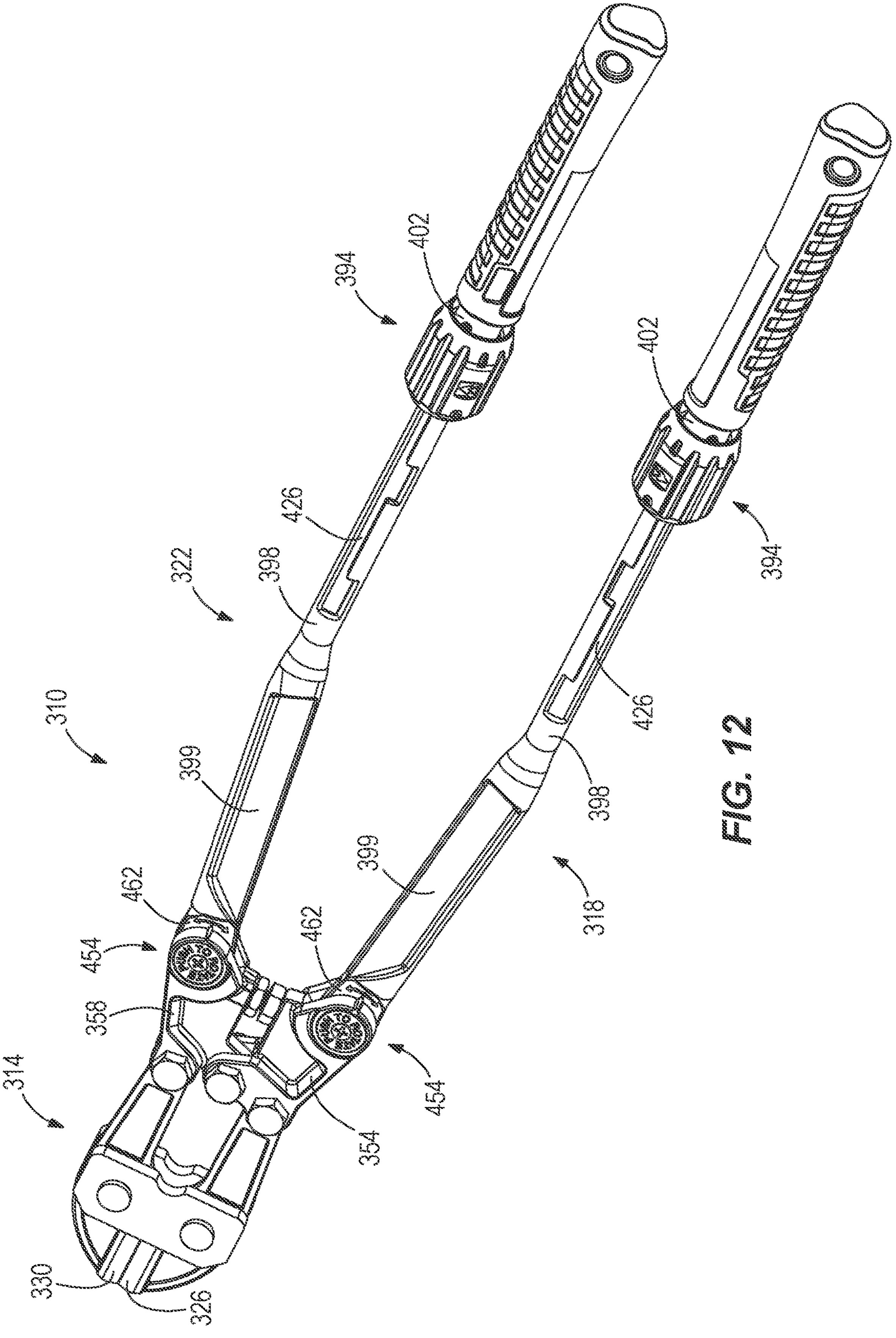
FIG. 12 is a perspective view of a bolt cutter with adjustable handles including length adjustment assemblies and angle adjustment assemblies in accordance with another embodiment of the invention.

With reference to FIG. 12, a bolt cutter 310 according to another embodiment is illustrated. The bolt cutter 310 is similar to the bolt cutter 10, and only the differences are described herein, with similar components identified with similar reference numerals incremented by 300. The bolt cutter 310 includes adjustable handles 318, 322 that each include a first handle member 398 and a second handle member 402. The first handle member 398 includes an extension portion 399 that is positioned between an end 462 of the first handle member 398 and a slot 426. The extension portion 399 may include a tapered shape. The extension portion 399 increases the overall length of the adjustable handles.

In some embodiments of the invention, the bolt cutter may include one or more length adjustment mechanisms and no angle adjustment mechanisms. In further embodiments of the invention, the bolt cutter may include one or more angle adjustment mechanisms and no length adjustment mechanism.

Although the invention had been described in detail with reference to a bolt cutter, other embodiments incorporate the invention on other types of cutters or manually operated tools (e.g., shears, scissors, trimmers, etc.).

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A bolt cutter comprising:

a bolt cutting head including:

a first cutting blade;

a second cutting blade; and a compound hinge coupled to the first cutting blade and the second cutting blade;

a first handle pivotally coupled to the bolt cutting head, the first handle including:

a first handle member, the first handle member including a first channel, wherein the first channel extends longitudinally along the first handle member;

a first extension member; and a first length adjustment assembly coupling the first handle member to the first extension member by engaging the first channel;

a second handle pivotally coupled to the bolt cutting head, the second handle including:

a second handle member, the second handle member including a second channel, wherein the second channel extends longitudinally along the second handle member;

a second extension member; and a second length adjustment assembly coupling the second handle member to the second extension member;

wherein the first handle member includes a third channel positioned on a side of the first handle member opposing the first channel, wherein the third channel extends longitudinally along the first handle member.

2. The bolt cutter of claim 1, wherein the second handle member includes a fourth channel positioned on a side of the second handle member opposing the second channel, wherein the fourth channel extends longitudinally along the second handle member.

3. The bolt cutter of claim 1, wherein the first length adjustment assembly includes a first movable lock rotatable about the first handle member and wherein the second length adjustment assembly includes a second movable lock rotatable about the second handle member.

4. The bolt cutter of claim 3, wherein the first movable lock includes a cover with a first inner surface, the first inner surface including a first inward extending projection and wherein the second movable lock includes a cover with a second inner surface, the second inner surface including a second inward extending projection.

5. The bolt cutter of claim 4, wherein the first channel includes a plurality of recessed pertions portions, such that when the first inward extending projection is received within a recessed portion the first handle member is locked with respect to the first extension member.

6. The bolt cutter of claim 4, wherein the first inward extending projection is positioned within the first channel such that the first handle member is unlocked with respect to the first extension member and slidable in a longitudinal direction.

7. The bolt cutter of claim 3, wherein the first extension member includes a first end adjacent to the first movable lock and a second end opposite of the first end, wherein the second end includes a hole extending through the first extension member, and wherein the second extension member includes a first end adjacent to the second movable lock and a second end opposite of the first end of the second extension member, wherein the second end includes a hole extending through the second extension member.

8. The bolt cutter of claim 7, wherein the first extension member includes a gripping portion positioned between the first end of the first extension member and the second end of hole extending through the first extension member and wherein the second extension member includes a gripping portion positioned between the first end of the second extension member and the second end of hole extending through the second extension member.

9. The bolt cutter of claim 1, wherein the first extension member includes a longitudinally extending bore such that the first handle member is telescopically received within the first extension member.

10. The bolt cutter of claim 9, wherein the second extension member includes a longitudinally extending bore such that the second handle member is telescopically received within the second extension member.

11. A cutter comprising:

a cutting head;

a first handle pivotally coupled to the cutting head, the first handle including:

a first handle member, the first handle member including a first channel, wherein the first channel includes a width and extends longitudinally along the first handle member;

a first extension member; and a first length adjustment assembly coupling the first handle member to the first extension member;

a second handle pivotally coupled to the cutting head;

wherein the first length adjustment assembly includes a connector rotatable about the first handle member and including a bore extending longitudinally along the connecter, and wherein the connector includes a projection extending inward toward the bore;

wherein the first channel includes a plurality of notches extending in a perpendicular direction relative to a longitudinal axis of the first channel, the plurality of notches having a width sized to receive the projections.

12. The cutter of claim 11, wherein the projection is configured to slide within the first channel in a longitudinal direction such that the first handle member is movable with respect to the first extension member to adjust a length the first handle extends from the cutting head.

13. The cutter of claim 11, wherein the projection rotates together with the connector such that the projection is movable between an unlocked position in the first channel in which the first handle member is movable with respect to the first extension member and a locked position in which the projection is received within one of the notches a notch fixing the first handle member in place relative to the first extension member.

14. The cutter of claim 13, wherein the first length adjustment assembly further comprises a spring positioned within the bore of the connector to bias the first length adjustment assembly toward the locked position.

15. The cutter of claim 11, wherein the cutting head includes a first cutting blade and a second cutting blade that together define a central axis when in a closed position, and wherein the first handle extends from the central axis at a first angle and the second handle extends from the central axis at a second angle, the second angle is different than the first angle.

16. A cutter comprising:

a cutting head;

a first handle coupled to the cutting head, the first handle extends a first length from the cutting head, the first handle including:

a first channel extending longitudinally along the first handle;

a first adjustment assembly including:

a rotatable collar coupled to the first handle and including a first projection, the first projection is received within the first channel and rotates within the first channel between a locked position in which the first length is fixed and an unlocked position in which the first length is adjustable;

a second handle coupled to the cutting head, the second handle extends a second length from the cutting head, the second handle including;

a second channel extending longitudinally along the second handle;

a second adjustment assembly including:

a rotatable collar coupled to the second handle and including a second projection, the second projection is received within the second channel and rotates within the second channel between a locked position in which the second length is fixed and an unlocked position in which the second length is adjustable;

wherein the first adjustment assembly further includes a spring positioned within a bore of the rotatable collar, the spring biasing the first adjustment assembly toward the locked position.

17. The cutter of claim 16, wherein the second length is different than the first length.

18. The cutter of claim 16, wherein the first channel includes a plurality of recessed portions configured to receive the first projection when the first adjustment assembly is in the locked position, and wherein each of the plurality of recessed portions corresponds to different first lengths; and wherein the second channel includes a plurality of recessed portions configured to receive the second projection when the second adjustment assembly is in the locked position, and wherein each of the plurality of recessed portions of the second channel corresponds to different second lengths.

* * * * *